(12) United States Patent
Tsunota et al.

(10) Patent No.: US 6,495,845 B1
(45) Date of Patent: Dec. 17, 2002

(54) CERAMIC RADIATION SHIELD AND RADIATION DETECTOR USING SAME

(75) Inventors: Kenichi Tsunota, Mohka (JP); Nobuyuki Yamada, Hanyu (JP); Shinji Furuichi, Mohka (JP); Takeo Sasaki, Mohka (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 09/588,232

(22) Filed: Jun. 6, 2000

(30) Foreign Application Priority Data

Sep. 30, 1999 (JP) .......................... 11-277852

(51) Int. Cl.[7] .............. G01T 1/20; G21F 1/00; H01J 1/52; H01J 1/54; H01J 29/10; G21K 4/00
(52) U.S. Cl. ............... 250/505.1; 250/515.1; 250/367; 250/368; 250/366
(58) Field of Search ............ 250/336.1, 505.1, 250/515.1, 390.1, 390, 482.1, 486.1, 338.4, 366, 367, 368

(56) References Cited

U.S. PATENT DOCUMENTS

| | | | |
|---|---|---|---|
| 4,525,628 A | | 6/1985 | DiBianca et al. |
| 5,059,800 A | * | 10/1991 | Cueman et al. ............ 250/367 |
| 5,208,460 A | * | 5/1993 | Rougeot et al. ............ 250/368 |
| 5,321,272 A | * | 6/1994 | Granfors et al. ......... 250/515.1 |
| 5,378,894 A | | 1/1995 | Akai |
| 5,386,122 A | * | 1/1995 | Yoshida et al. ............ 250/368 |
| 5,594,253 A | * | 1/1997 | Bueno et al. ............ 250/486.1 |
| 6,304,626 B1 | * | 10/2001 | Adachi et al. .............. 378/19 |
| 6,340,436 B1 | * | 1/2002 | Yamada et al. ........ 252/301.45 |

FOREIGN PATENT DOCUMENTS

| | | |
|---|---|---|
| EP | 0 097 296 | 1/1984 |
| EP | 0 354 605 | 2/1990 |

* cited by examiner

*Primary Examiner*—John R. Lee
*Assistant Examiner*—David A. Vanore

(57) ABSTRACT

Sintered ceramics having such high radiation shielding capability and so easy to machine that they can be used as a radiation shield for radiation detectors are disclosed. The ceramics show a radiation shielding capability more than 90% and preferably have high light reflecting performance. They may comprises rare-earth oxides such as gadolinium oxide, oxide of at least one of vanadium, tantalum and niobium and alkali-earth oxide which is used for a sintering agent. They can be used as a radiation shield in place of a molybdenum or tungsten radiation shielding plate and also as a light reflecting film instead of titanium dioxide film in a radiation detector for radiation CT equipment.

8 Claims, 3 Drawing Sheets

CERAMIC RADIATION SHIELD AND RADIATION DETECTOR USING SAME

BACKGROUND OF THE INVENTION

1. Field of the Invention

The present invention relates generally to a ceramic radiation shield and radiation detector using the same, and more particularly to a radiation detector used for computer-assisted tomography (CT) equipment relying on X rays, y rays or rays from other radiation sources, a ceramic radiation shield suitable for use in the same, and a method for making such a ceramic radiation shield.

2. Description of the Related Art

In radiographic CT equipment, arrays of radiation detectors are disposed at positions symmetrical to radiation sources (X-ray tubes, for example) with respect to a subject being examined, and the internal structure of the subject is observed by measuring the intensity of the radiation transmitted through the subject. Arrays of radiation detectors, which are equivalent to picture elements, should be manufactured into as small a size as possible, and arranged as densely as possible to improve resolution.

The radiation detector usually has a laminated construction of radiation scintillators and semiconductor photo-detector devices so that the scintillators which are open to the radiation-source side receive X-ray and other radiation beams. The scintillator, made of $CdWO_4$, $Bi_4Ge_3O_{12}$, $Gd_2O_2S$: Pr(Ce, F), emits visible light when exposed to incident radiation. The visible light enters on the semiconductor photo-detector element provided on the rear surface of the scintillator to convert it into electrical signals. If the radiation incident on the scintillator passes through the scintillator and enters again into adjacent scintillators, a phenomenon called crosstalk occurs, leading to lowered resolution. To cope with this, radiation shields made of Mo, W, Pb or other metallic sheets are provided between the scintillators to prevent radiation from transmitting through them.

Visible light, which is generated by the scintillators in the direction of the total solid angle, must be led to the semiconductor photo-detector elements provided on the rear surface of the scintillators. Consequently, the scintillator has a construction that its periphery, except the surfaces opposing the semiconductor photo-detector elements, is covered with a substance having good light reflectivity. The surfaces at which the scintillators adjoin each other are so large that white paint is filled in between the adjoining scintillator surfaces, or shields coated with white paint are interposed between the scintillators. As the white paint, a mixture of titanium oxide and a resin, such as epoxy, is often used.

For this reason, the radiation detector often has a construction that a radiation shield made of Mo, etc. which is bonded with a light reflecting sheet (or film), e. g. a resin titanium oxide on its both sides is interposed between the scintillators.

To make a radiation shield from Mo, W, Pb, etc., it is necessary to machine Mo, W, Pb or other metallic sheet into a thickness of 50 to 100 $\mu$m. These metallic materials are extremely hard to machine into a desired thickness because they are softer in some cases, or harder in other cases, than iron, aluminum and others. This may often cause deviations in the dimensions of intervals between the scintillators.

In another manufacturing method, radiation shielding sheets made of Mo, W or Pb and scintillator sheets are laminated alternately, and the radiation receiving surface and the light emitting surface are lapped. During this lapping operation, the radiation shields tend to be left unpolished, protruding from the scintillators because the scintillators are easily polished away, while the radiation shields are hard to be polished away. Thus, when the laminate is mounted on a semiconductor photo-detector element, the protruded Mo, W or Pb could impair the photo-detector element surface.

When the light-reflecting sheet (or film) made of titanium oxide and a resin is used, other problems are likely to occur. In the manufacture of the light-reflecting sheet, the sheet is heated to about 80° C. This heat has discolored the resin, such as epoxy, lowering the reflectivity of the reflecting sheet. Furthermore, the polishing solution or abrasive grains used in the manufacture has caused scratches on the surface, or contaminated the surface, leading to a local reduction in the reflectivity of the reflecting sheet.

Furthermore, uneven thickness or warpage has occurred during the manufacture of the light reflecting sheet, leading to changes in reflectance, or uneven output produced by the element coefficient.

SUMMARY OF THE INVENTION

It is therefore an object of the present invention to provide a radiation shield made of sintered ceramics that has high radiation shielding capability, is easy to machine, and can be used as a radiation shield in place of Mo, W and Pb.

It is another object of the present invention to provide a radiation shield made of sintered ceramics having light reflecting performance.

It is still another object of the present invention to provide a radiation detector incorporating radiation shields made of sintered ceramics.

It is a further object of the present invention to provide a manufacturing method of a radiation shield made of sintered ceramics.

Cross-sectional front views of a radiation detector according to the present invention are shown in FIGS. 1 and 2. In this radiation detector, a multitude of scintillators 2 are arranged adjacent to each other on a semiconductor photo-detector element 1, and radiation shields 3 are provided between the scintillators 2. In the present invention, the radiation shield 3 is made of a sintered ceramic material having radiation shielding capability. The radiation shielding rate of the sintered ceramics should be not lower than 90%, or more preferably not lower than 95%. In the radiation detector shown in FIG. 1, light reflecting films 4 are provided between the radiation shields 3 and the scintillators 2. As the light reflecting film 4, a previously known mixture of titanium oxide and epoxy resin may be used. The radiation shield 3 and the light-reflecting film 4 are collectively called as a separator. In the present invention, a mixture of 0 to 50 mol %, or more desirably 3 to 33 mol %, in total of at least one rare-earth oxide selected from the group of Gd, La, Ga, Y, Ce, Nd, Pr, Sm, Dy and Yb oxides, and 0 to 33 mol %, or more desirably 0 to 28 mol %, in total of at least one alkali-earth oxide selected from the group of Ca, Ba, Mg and Sr oxides, and the balance being at least one of oxides of V, Ta and Nb compose as the sintered ceramics for use as the radiation shield 3.

In the radiation detector shown in FIG. 2, the radiation shield 3 is made of a white sintered ceramics. Having not only radiation shielding capability but also high light reflecting capability, this sintered ceramic material has a radiation shielding rate of not less than 90%, or more desirably not less than 95%, and a light reflecting capability of not less than 70%, or more desirably not less than 90%. In this case, no separate light reflecting film is needed since the sintered ceramic material itself has light reflecting capability. In this case, therefore, only the radiation shield 3 is called the separator.

A mixture of 3 to 33 mol %, or more desirably 5 to 33 mol %, in total of at least one rare-earth oxide selected from the group of Gd, La, Ga and Y oxides, and 0 to 33%, or more desirably 0 to 28 mol %, in total of at least one alkali-earth oxide selected from the group of Ca, Ba, Mg and Sr oxides, and the balance being at least one of Ta and Nb, compose the white sintered ceramics according to the present invention.

If at least one of Ce, Nd, Pr, Sm and Yb oxides, or V oxides is used, the mixture does not result in a white ceramic material, but in a colored one. Thus, the resulting material has an effect of radiation shielding, but does not have a light reflecting effect due to reduced light reflectance.

In the present invention where the scintillators and the separators are bonded adjacent to each other, when a sintered ceramic material is used as the separator, the difference in thermal expansion coefficients between them should preferably be not more than $2 \times 10^{-6\circ}$ C., or more desirably not more than $1 \times 10^{-6}/^\circ$ C.

FIG. 3 is a block diagram of the manufacturing process of sintered ceramics, which is obtained by weighing and wet blending rare-earth, alkali-earth oxides and V, Nb and Ta oxides so as to achieve the aforementioned composition. The mixture is then calcined to approx. 1000° C. in air for an hour. The calcined mixture is ground to a grain size of about 0.8~1.0 $\mu$m, and a binder (PVA) is added to the ground mixture for granulation. The granulated grains are formed into a green body in a press, sintered in the air at a temperature of 1600 to 1800° C., and subjected to HIP (hot isostatic pressing) at 1400 to 1800° C., or more preferably at 1500° C. and 1000 atmospheric pressure, to increase the density of the sintered body. After that, the body is annealed in a 1000 to 1300° C. air or oxygen as a measure to adjust the amount of oxygen. In place of sintering and HIP treatments, the mixture can be hot-pressed at 1400 to 1800° C.

DESCRIPTION OF THE PREFERRED EMBODIMENTS

The present invention will be described in more detail, referring to the experiments shown below.

EXPERIMENT 1

Figure 3:
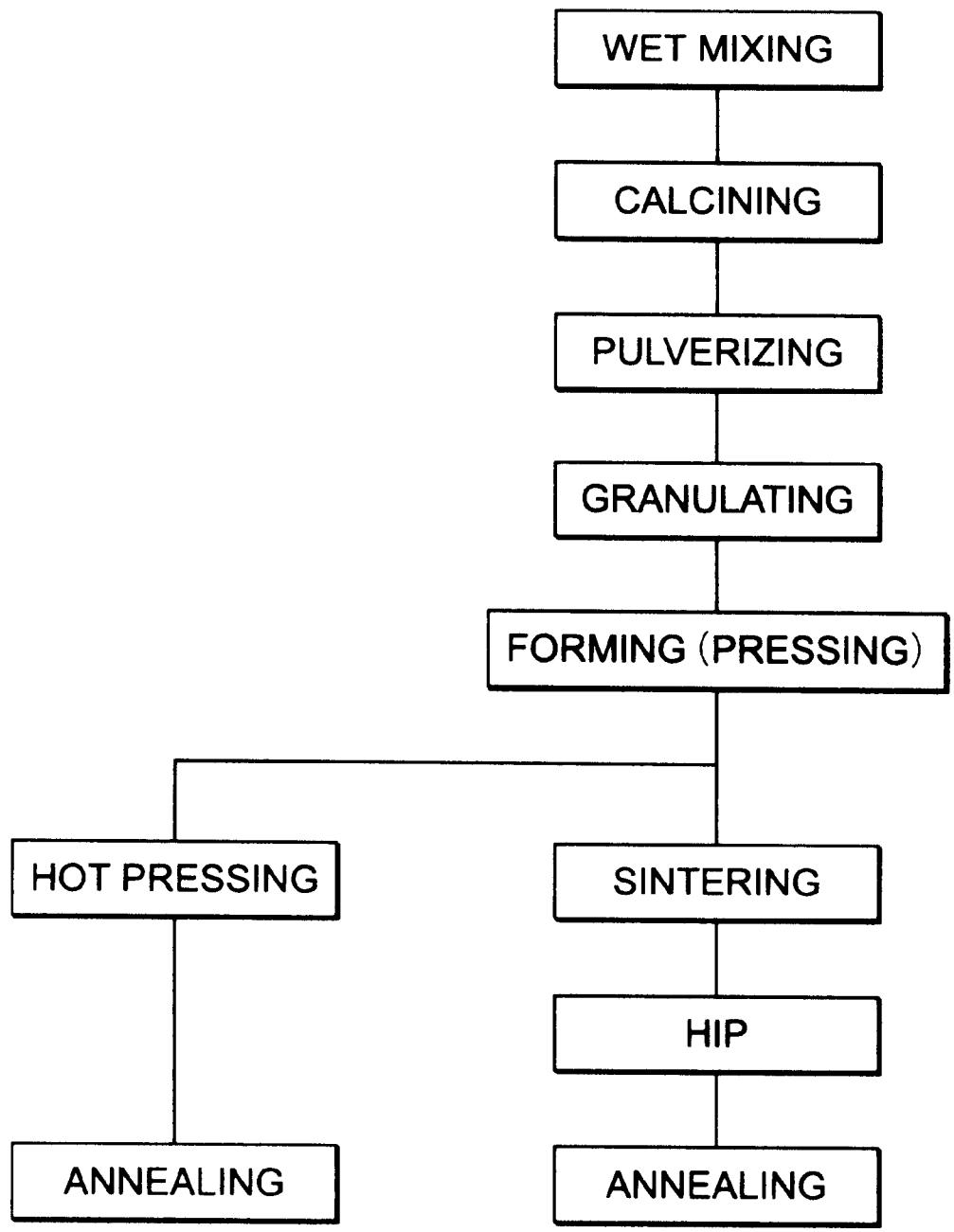
FIG. 3 is a flow chart showing the manufacturing process of sintered ceramics according to the present invention.

Mixtures having chemical compositions shown in Nos. 1 to 19 in Table 1 were sintered in the air at the sintering temperature of 1800° C., and subjected to HIP at 1500° C. and 1000 atmospheric pressure to obtain sintered ceramic materials in accordance with the manufacturing method described referring to FIG. 3. The X-ray shielding rate and light reflectance of the sintered ceramic materials obtained were measured. The measured values are shown in Table 1, together with sintering performance.

In Tables 1, 2 and 6, the names of metal elements given mean their oxides.

Figure 4A:
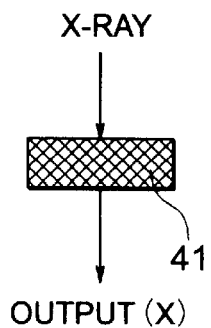
FIG. 4 is a diagram for explaining the measuring method of X-ray shielding rate.
Figure 4B:
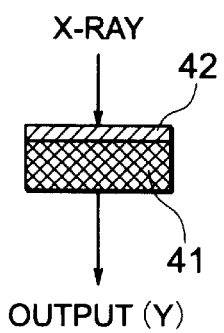

The X-ray shielding rate was obtained by calculating the following equation:

X-ray shielding rate $(\%)=(X-Y)/X \times 100(\%)$ where X is the output obtained when an X-ray beam of a tube voltage of 35 kV is transmitted through a scintillator sheet 41, as shown in FIG. 4A, and Y is the output obtained when the same X-ray beam is transmitted through a sample 42 which is a 30 mm×20 mm×0.2 mm (thick.) sintered ceramic material applied to one side of the scintillator sheet 41, as shown in FIG. 4B. The light reflectance is a ratio of the intensity of reflected light to the intensity of incident light when a light beam of a wavelength of 512 nm is applied to a 30 mm×20 mm×0.2 mm(thick.) sintered ceramic material. Sintering performance is expressed in the table by the ratio of the density measured with the water displacement test for each composition to the theoretical density.

Nos. 1 and 2 samples, which contained excessive amounts of alkali-earth oxides, had so many cracks in their sintered products that their X-ray shielding rates and light reflectance could not be measured. Nos. 3 to 19 samples having X-ray shielding rates of not less than 90% were suitable for use as X-ray shielding ceramics. However, the densities of Nos. 13 to 19 samples containing no or little alkali-earth oxides and much rare-earth oxides were as low as 0.970 to 0.982, and had poor sintering performance.

The light reflectance of No. 3 sample containing no rare-earth oxides was as low as 70%, and its density was 0.982, a relatively low level.

A comparison of those samples containing 25% of alkali-earth oxides reveals,that all of the alkali-earth oxides have equal effects of improving sintering performance, as evident from No. 5 sample containing 25% of Ca oxide, No. 10 sample containing 25% of Mg oxide, No. 11 sample containing 25% of Ba oxide, No. 12 sample containing 25% of Sr oxide, and Nos. 8 and 9 samples containing 25% in total of Ca and Mg oxides.

As is obvious by comparing No. 13 with No. 14, and No. 18 with No. 19, V, Nb and Ta oxides have similar effects in terms of sintering performance and radiation shielding rate. As is evident from No. 18 sample, the sintered ceramic material having V oxide is not white-colored and has lowered light reflectance. Consequently, Ta and Nb oxides, excluding V oxide, should preferably be used.

TABLE 1

| Sample No. | Blend ratio of oxides (mol %) | | | | | | | | Sintering performance/ theoretical density ratio | X-ray shielding rate (%) at 35 kV | Light reflectance (%) at 512 nm |
| --- | --- | --- | --- | --- | --- | --- | --- | --- | --- | --- | --- |
| | Gd | Ca | Mg | Ba | Sr | V | Ta | Nb | | | |
| 1 | 0 | 50 | 0 | 0 | 0 | 0 | 50 | 0 | 0.80 | Could not be evaluated | Could not be evaluated |
| 2 | 0 | 40 | 0 | 0 | 0 | 0 | 60 | 0 | 0.85 | " | " |
| 3 | 0 | 33 | 0 | 0 | 0 | 0 | 67 | 0 | 0.982 | 96.5 | 70 |
| 4 | 3 | 27 | 0 | 0 | 0 | 0 | 70 | 0 | 0.986 | 96.8 | 88 |
| 5 | 5 | 25 | 0 | 0 | 0 | 0 | 70 | 0 | 0.987 | 96.0 | 98 |
| 6 | 12 | 17 | 0 | 0 | 0 | 0 | 71 | 0 | 0.986 | 95.0 | 97 |
| 7 | 18 | 8 | 0 | 0 | 0 | 0 | 74 | 0 | 0.986 | 94.5 | 98 |
| 8 | 5 | 23 | 2 | 0 | 0 | 0 | 70 | 0 | 0.985 | 96.0 | 96 |
| 9 | 5 | 13 | 12 | 0 | 0 | 0 | 70 | 0 | 0.986 | 95.5 | 97 |
| 10 | 5 | 0 | 25 | 0 | 0 | 0 | 70 | 0 | 0.986 | 96.0 | 96 |
| 11 | 5 | 0 | 0 | 25 | 0 | 0 | 70 | 0 | 0.986 | 95.5 | 97 |
| 12 | 5 | 0 | 0 | 0 | 25 | 0 | 70 | 0 | 0.986 | 96.0 | 97 |
| 13 | 25 | 0 | 0 | 0 | 0 | 0 | 75 | 0 | 0.981 | 95.5 | 98 |
| 14 | 25 | 0 | 0 | 0 | 0 | 0 | 0 | 75 | 0.982 | 95.6 | 97 |
| 15 | 25 | 0 | 0 | 0 | 0 | 0 | 40 | 35 | 0.982 | 95.4 | 98 |
| 16 | 33 | 0 | 0 | 0 | 0 | 0 | 67 | 0 | 0.981 | 94.5 | 99 |
| 17 | 40 | 0 | 0 | 0 | 0 | 0 | 60 | 0 | 0.970 | 90.0 | 90 |
| 18 | 50 | 0 | 0 | 0 | 0 | 50 | 0 | 0 | 0.971 | 93.0 | 60 |
| 19 | 50 | 0 | 0 | 0 | 0 | 0 | 50 | 0 | 0.971 | 90.0 | 89 |
| Comparative example | | | | | Mo | | | | — | 96.0 | 65 |

EXPERIMENT 2

Sintered ceramic samples were prepared by replacing Gd oxide in No. 13 sample given in Table 1 with the same amount of other rare-earth element oxides, that is, La to Yb oxides, and subjecting to the same treatment as in Experiment 1. The sintering performance, X-ray shielding rate and light reflectance of these samples were evaluated, and the results are shown in Table 2. The data indicate that the sintered ceramics samples having any compositions can be successfully sintered, have comparable X-ray shielding rates, and can be used as radiation shielding ceramics. The evaluation results also reveal that all of the rare-earth elements have similar effects in terms of sintering performance and radiation shielding rate no matter what the type. Nos. 23 to 28 samples, however, are not suitable for light reflecting materials because they have light reflectance as low as under 60%. By using Gd, La, Ga and Y oxides as rare-earth oxides, white sintered ceramics having high light reflectance were obtained.

EXPERIMENT 3

Figure 1:
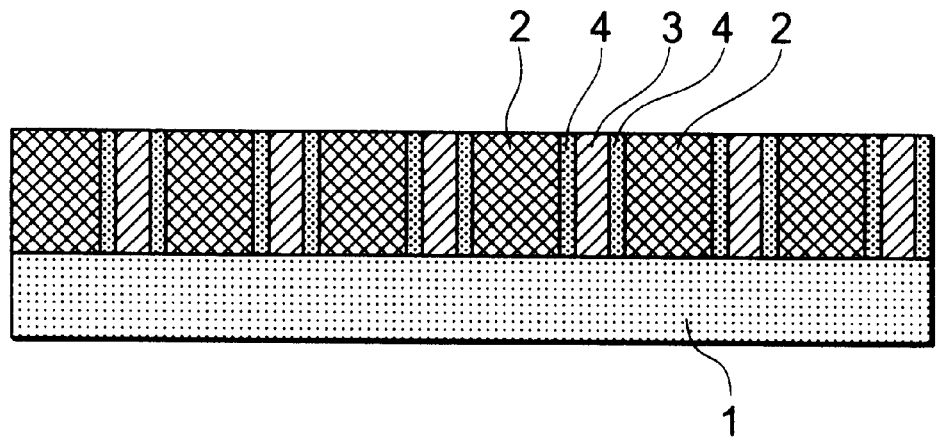
FIG. 1 is a cross-sectional front view of a radiation detector according to the present invention.
Figure 5:
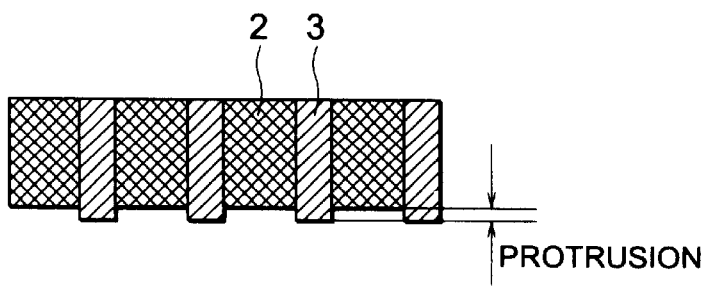
FIG. 5 is a diagram for explaining the measuring method of the height of the protrusion.

Radiation detectors as shown in FIG. 1 were prepared using ceramics of Nos. 3 to 16 and 18 samples given in Table 1. 0.05-mm thick light reflecting films prepared by blending and kneading titanium oxide with a resin were applied to both sides each of 0.1-mm thick sintered ceramic sheets as separators inserting between the scintillators. As a comparative example, 0.1-mm thick Mo sheets and 0.05-mm thick light reflecting films made of titanium oxide plus a resin were used. The protrusion height of the radiation shield 3 from the surface of the scintillator 2 when the light-emitting surface was lapped, and the fraction defective of the radiation detectors are given in Table 3. The sample numbers in the following description are assumed to be the same as those having the compositions shown in Tables 1 and 2. The protrusion height means the residual protrusion, expressed in $\mu$m, of the radiation shield 3 when the light-emitting surface was lapped with "White-alundum" #2500, as shown in FIG. 5. Defective radiation detectors mean those which

TABLE 2

| Sample No. | Blend ratio of oxides (mol %) | | | | | | | | | | Sintering performance/ theoretical density ratio | X-ray shielding rate (%) at 35 kV | Light reflectance (%) at 512 nm |
| --- | --- | --- | --- | --- | --- | --- | --- | --- | --- | --- | --- | --- | --- |
| | La | Ga | Y | Ce | Nd | Pr | Sm | Dy | Yb | Ta | | | |
| 20 | 25 | 0 | 0 | 0 | 0 | 0 | 0 | 0 | 0 | 75 | 0.985 | 95.5 | 98 |
| 21 | 0 | 25 | 0 | 0 | 0 | 0 | 0 | 0 | 0 | 75 | 0.985 | 95.4 | 98 |
| 22 | 0 | 0 | 25 | 0 | 0 | 0 | 0 | 0 | 0 | 75 | 0.984 | 96.5 | 98 |
| 23 | 0 | 0 | 0 | 25 | 0 | 0 | 0 | 0 | 0 | 75 | 0.985 | 95.5 | 60 |
| 24 | 0 | 0 | 0 | 0 | 25 | 0 | 0 | 0 | 0 | 75 | 0.985 | 95.6 | 55 |
| 25 | 0 | 0 | 0 | 0 | 0 | 25 | 0 | 0 | 0 | 75 | 0.984 | 95.5 | 57 |
| 26 | 0 | 0 | 0 | 0 | 0 | 0 | 25 | 0 | 0 | 75 | 0.985 | 95.6 | 60 |
| 27 | 0 | 0 | 0 | 0 | 0 | 0 | 0 | 25 | 0 | 75 | 0.984 | 95.4 | 59 |
| 28 | 0 | 0 | 0 | 0 | 0 | 0 | 0 | 0 | 25 | 75 | 0.983 | 95.7 | 58 |
| 29 | 13 | 12 | 0 | 0 | 0 | 0 | 0 | 0 | 0 | 75 | 0.984 | 95.5 | 98 |
| Comparative example | | | | | Mo | | | | | | — | 96.0 | 65 | generate no output current, or have too high background current due to damage caused on the semiconductor photodetector elements by protruded radiation shields.

TABLE 3

| Sample No. | Protrusion height of radiation shield ($\mu$m) | Fraction defective of detectors (%) |
|---|---|---|
| 3 | 0.5 | 0.9 |
| 4 | 0.6 | 0.9 |
| 5 | 0.8 | 1.0 |
| 6 | 1.0 | 1.0 |
| 7 | 1.3 | 1.0 |
| 8 | 0.8 | 0.8 |
| 9 | 0.9 | 0.7 |
| 10 | 0.8 | 0.5 |
| 11 | 0.8 | 1.0 |
| 12 | 1.8 | 2.0 |
| 13 | 1.5 | 2.0 |
| 14 | 1.5 | 2.0 |
| 15 | 1.3 | 1.0 |
| 16 | 0.8 | 0.6 |
| 18 | 0.7 | 0.5 |
| Comparative example | 3.0 | 5.0 |

When the radiation shields according to the present invention were used, the protrusion height of the radiation shields became not higher than 2.0 $\mu$m, and the fraction defective of the detectors became extremely small. This is attributable to the fact that a small protrusion height was left unpolished because both the scintillator material and the radiation shields of the present invention were sintered ceramics which are very much alike in hardness, polishing speed, polishing performance, compared with a combination of the sintered ceramic scintillators and metallic sheets as used in the comparative example.

EXPERIMENT 4

Figure 2:
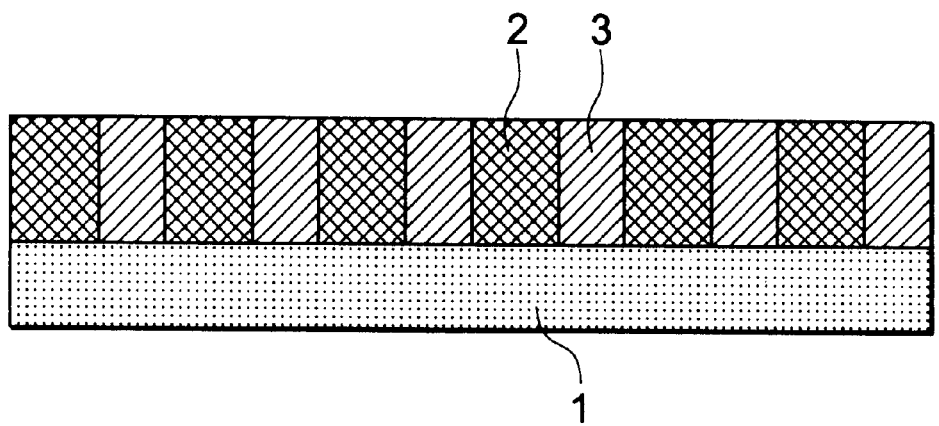
FIG. 2 is a cross-sectional front view of another radiation detector according to the present invention.

16-channel radiation detectors as shown in FIG. 2 were prepared using ceramic materials of Nos. 5 to 16, and Nos. 20 and 21 samples from the compositions given in Tables 1 and 2. 0.2-mm thick sintered ceramic sheets were used as separators interposed between the scintillators, and no light reflecting films made of titanium oxide were used. As a comparative example, that used in Experiment 3 was used. The measurement results of the output ratios, variations between elements, and crosstalk of these radiation are given in Table 4.

TABLE 4

| Sample No. | Output ratio at 120 kV | Variations between elements (%) | Crosstalk (%) |
|---|---|---|---|
| 5 | 1.05 | 3.4 | 4 |
| 6 | 1.02 | 4.1 | 4 |
| 7 | 1.05 | 4.2 | 3 |
| 8 | 1.00 | 3.4 | 3 |
| 9 | 1.02 | 4.1 | 4 |
| 10 | 1.00 | 4.2 | 3 |
| 11 | 1.02 | 4.0 | 3 |
| 12 | 1.02 | 4.2 | 3 |
| 13 | 1.05 | 3.4 | 4 |
| 14 | 1.02 | 3.4 | 4 |
| 15 | 1.05 | 3.5 | 3 |
| 16 | 1.07 | 4.1 | 4 |
| 20 | 1.05 | 3.6 | 3 |
| 21 | 1.05 | 3.7 | 3 |
| Comparative example | 1.00 | 10.0 | 4 |

Figure 6:
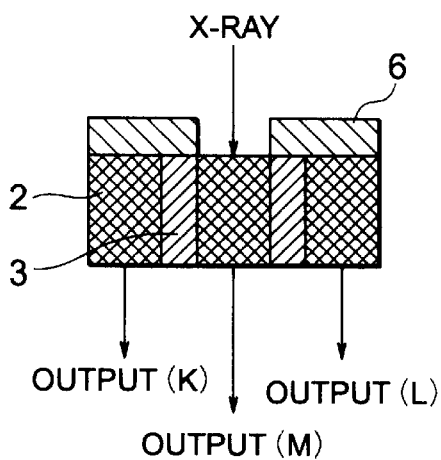
FIG. 6 is a diagram for explaining the measuring method of crosstalk.

The output ratio is the relative value of the output per scintillator when an X-ray beam of a tube voltage of 120 kV was applied to the radiation detector and the output of the radiation detector of the comparative example. Variations between elements were obtained from the following equation Variations between elements=(maximum element output−minimum element output)/maximum element output×100 (%)

based on the output when the same X-ray beam was applied to the radiation detector. The crosstalk values were obtained by closing the light-receptor windows of the scintillators with Pb sheets 6 of a thickness enough to prevent X-ray beams from passing through, except for the light-receptor window of a given scintillator, as shown in FIG. 6, ting from the following equation the ratio of the magnitude of the output of the having an open light-receptor window to the output of the surrounding scintillators.

Crosstalk (%)=(K+L)/2M×100 (%)

As is obvious from Table 4, the radiation detector using the ceramic material according to the present invention as the separators had improved outputs and reduced variations between elements, compared with those using Mo sheets and titanium oxide (including resins) in the comparative example. This is attributable to that the amount of light introduced in the light detecting part increased and the output increased accordingly because the amount of reflection increased as a result of the reduced absorption of light in the separators. Variations between elements were less than ½ that of the comparative example because variations in the reflectance on the surface of the separators were reduced.

Crosstalk was almost the same as in the case of the comparative example using Mo sheets. This is attributable to that the sintered ceramics according to the present invention has almost the same radiation shielding performance as that of Mo.

EXPERIMENT 5

The light reflectance of separators made of the sintered ceramics according to the present invention (having the composition of No. 5 sample in Table 1) and separators made of conventional Mo and titanium oxide (including a resin) was measured in the same manner as in Experiment 1. The samples were held at 80° C. for a predetermined time, and changes in the light reflectance of the samples were measured with the lapse of time. The results were given in Table 5.

TABLE 5

| | Light reflectance (%) | |
|---|---|---|
| Hold time (hr) | Comparative example (M0 + TiO2 resin) | Embodiment (No. 5 sample) |
| 0 | 96 | 98 |
| 10 | 94 | 98 |
| 100 | 91 | 98 |
| 1000 | 90 | 98 |

As is evident from Table 5, the light reflectance of the comparative example fell from 96% before heating to 90% after the lapse of 1000 hours. The sintered ceramic material according to the present invention showed a stable light reflectance of 98%. This is attributable to the fact that epoxy resin in the comparative example discolored, while the sintered ceramics of the present invention did not.

EXPERIMENT 6

The fraction defective values of exfoliation were shown in Table 6, together with the thermal expansion coefficients (at. temperatures from room temperature to 100° C.), for the radiation detectors shown in FIG. 1 prepared by using sintered ceramics according to the present invention (having the compositions of Nos. 5, 6 and 16 samples in Table 1 above) as the scintillators, and the radiation detectors of the comparative example using Mo sheets and titanium oxide (including a resin) as the separators.

TABLE 6

| Sample No. | Blend ratio of oxides (mol %) | | | Thermal expansion coefficient ($\times 10^{-6}$/° C.) | Fraction defective of exfoliation |
|---|---|---|---|---|---|
| | Gd | Ca | Ta | r.t. ~ 100° C. | (%) |
| 5 | 5 | 25 | 70 | 6.0 | 0.7 |
| 6 | 12 | 17 | 71 | 7.0 | 0.1 |
| 16 | 33 | 0 | 67 | 7.5 | 0 |
| Comparative example | Mo + TiO$_2$ resin | | | 5.0 | 1.0 |
| Reference | Gd$_2$O$_2$S:Pr(Ce,F) | | | 7.8 | — |

The fraction defective values of exfoliation were smaller when the sintered ceramics of the present invention were used, than those for the comparative example using Mo. With No. 16 ceramic material having almost the same thermal expansion coefficient as that of the scintillator elements, no exfoliation defects occurred.

It can be said from the above data that the fraction defective begins to fall with the difference in thermal expansion coefficient becoming lower than $2\times10^{-6}$/° C., and the fraction defective falls below 0.1% as the difference in thermal expansion coefficient becomes lower than $1\times10^{-6}$/° C.

EXPERIMENT 7

To establish manufacturing conditions, the measuring results of sintering performance, that is, density, X-ray shielding rate, etc. of samples when the sintering temperature, hot-press temperature and annealing temperature in the manufacturing flow chart shown in FIG. 3 are given below. The samples used had the composition of No. 13 sample in Table 1.

First, the X-ray shielding rate of samples prepared by sintering at temperatures of 1500 to 1800° C., and subjecting to hot isostatic pressing operation at 1500° C. and 1000 atmospheric pressure was measured. The HIP temperature was set at 1500° C. because HIP is usually performed at temperatures 200 to 300° C. lower than sintering temperature. The results are shown in Table 7. The samples sintered at 1500° C. had many voids, showing poor sintering performance. They could not be subjected to HIP and evaluated their X-ray shielding rate. The samples sintered at 1600 to 1800° C., on the other hand, had good sintering performance, and sufficiently high X-ray shielding rate as their density was improved after HIP. It can be said from the above results that sintering temperature should be 1600 to 1800° C.

TABLE 7

| | Evaluation results (No. 13 sample) | | |
|---|---|---|---|
| Sintering temperature (° C.) | Density (Theoretical density ratio) | | X-ray shielding rate (%) |
| | Without HIP | With HIP | |
| 1500 | 0.85 | Could not be subjected to HIP | Could not be evaluated |
| 1600 | 0.92 | 0.980 | 95.0 |
| 1700 | 0.94 | 0.981 | 95.5 |
| 1800 | 0.94 | 0.981 | 95.5 |

In place of the process where the aforementioned normal-pressure sintering is followed by HIP, sintering was performed by hot pressing. The measuring results of sintering performance, that is, density and X-ray shielding rate for the samples sintered by hot pressing at 1300 to 1800° C. are shown in Table 8. The samples hot-pressed at 1300° C. had any voids and low density, whereas those hot-pressed at 1400 to 1800° C. had a theoretical density ratio of not less than 98% and few voids.

TABLE 8

| Sintering temperature (° C.) | Evaluation results | |
|---|---|---|
| | Density (Theoretical density ratio) | X-ray shielding rate (%) |
| 1300 | 0.86 | 89.5 |
| 1400 | 0.970 | 94.5 |
| 1500 | 0.975 | 95.6 |
| 1600 | 0.980 | 95.2 |
| 1700 | 0.981 | 95.3 |
| 1800 | 0.985 | 95.5 |

Next, the samples prepared by sintering at normal pressures at 1600° C. and subjected to HIP at 1600° C. and 1000 atmospheric pressure were annealed by changing temperature from 900° C. to 1400° C. The post-anneal density and the state of cracking are shown in Table 9. The results that the density after HIP was 0.98 indicate that annealing at lower than 1000° C. cannot perfectly eliminate lattice strains due to oxygen deficiency, inducing cracks during processing. Annealing at not lower than 1400° C. caused voids to grows, resulting in low density. It follows from this that annealing should be performed at 1000 to 1300° C.

TABLE 9

| | Evaluation results | |
|---|---|---|
| Annealing temperature (° C.) | Density (Theoretical density ratio) | Cracking during processing |
| 900 | 0.985 | Cracks found |
| 1000 | 0.985 | No cracks found |
| 1100 | 0.985 | " |
| 1200 | 0.984 | " |
| 1300 | 0.983 | " |
| 1400 | 0.965 | " |

As described in detail above, the sintered ceramics according to the present invention can be used in radiation detectors, such as radiation CT equipment, since the sintered ceramics of the present invention exhibit excellent radiation shielding performance, can be assembled into the semiconductor photo detectors at high yields with less flaws caused on the semiconductor photo detectors during assembly. The sintered ceramics according to the present invention is white colored, and has such an excellent light reflecting performance that no additional light reflecting sheets (or films) are needed when used as separators for the radiation detector.

What is claimed is:

1. A radiation detector comprising:

a plurality of semiconductor photo-detector elements and a laminate of a plurality of scintillators, radiation shields interposed between the adjacent scintillators and light reflectors interposed between each of the scintillators and each of the radiation shields, the laminate being mounted on the plurality of the semiconductor photo-detector elements, each of the radiation shields comprising a sintered ceramic having radiation shielding capability, and the sintered ceramic having a composition composed of at least one rare-earth oxide of 0 to 50 mol % in total selected from the group consisting of Gd, La, Ga, Y, Ce, Nd, Pr, Sm, Dy and Yb oxides, at least one alkali-earth oxide of 0 to 33 mol % in total selected from the group consisting of Ca, Ba, Mg and Sr oxides and the balance being at least one oxide selected from the group consisting of V, Ta and Nb oxides.

2. The radiation detector as set forth in claim 1, wherein each of the radiation shields comprises the sintered ceramic having a composition composed of at least one rare-earth oxide of 3 to 33 mol % in total selected from the group consisting of Gd, La, Ga, Y, Ce, Nd, Pr, Sm, Dy and Yb oxides, at least one alkali-earth oxide of 0 to 28 mol % in total selected from the group consisting of Ca, Ba, Mg and Sr oxides and the balance being at least one oxide selected from the group consisting of V, Ta and Nb oxides.

3. The radiation detector as set forth in claim 1, wherein each of the scintillators and the radiation shields comprises a bottom surface facing the semiconductor photo-detector elements, and wherein the bottom surfaces of the scintillators and the bottom surfaces of the radiation shields have a height difference of not more than 2 $\mu$m with respect to each other.

4. The radiation detector as set forth in claim 1, wherein the radiation shields and the scintillators have a thermal expansion coefficient difference of not more than $2 \times 10^{-6}$/degree Celsius with respect to each other.

5. A radiation detector comprising:

a plurality of semiconductor photo-detector elements and a laminate of a plurality of scintillators and radiation shields interposed between the adjacent scintillators, the laminate being mounted on the plurality of the semiconductor photo-detector elements, each of the radiation shields comprising a white sintered ceramic having radiation shielding and high light-reflecting capabilities, and the white sintered ceramic having a composition composed of at least one rare-earth oxide of 3 to 33 mol % in total selected from the group consisting of Gd, La, Ga, and Y oxides, at least one alkali-earth oxide of 0 to 33 mol % in total selected from the group consisting of Ca, Ba, Mg and Sr oxides and the balance being at least one oxide selected from the group consisting of Ta and Nb oxides.

6. The radiation detector as set forth in claim 5, wherein each of the radiation shields comprises the white sintered ceramic having a composition composed of at least one rare-earth oxide of 5 to 33 mol % in total selected from the group consisting of Gd, La, Ga and Y oxides, at least one alkali-earth oxide of 0 to 28 mol % in total selected from the group consisting of Ca, Ba, Mg and Sr oxides and the balance being at least one oxide selected from the group consisting of Ta and Nb oxides.

7. The radiation detector as set forth in claim 5, wherein each of the scintillators and the radiation shields comprises a bottom surface facing the semiconductor photo-detector elements, and wherein the bottom surfaces of the scintillators and the bottom surfaces of the radiation shields have a height difference of not more than 2 $\mu$m with respect to each other.

8. The radiation detector as set forth in claim 5, wherein the radiation shields and the scintillators have a thermal expansion coefficient difference of not more than $2 \times 10^{-6}$/degree Celsius with respect to each other.

* * * * *